United States Patent [19]
Boultinghouse et al.

[11] Patent Number: 5,109,180
[45] Date of Patent: Apr. 28, 1992

[54] APPARATUS PROVIDING A SHATTER-RESISTANT ELECTRIC LAMP

[75] Inventors: Harold D. Boultinghouse, Chandler, Ariz.; Kenneth P. Taylor, Bartlesville, Okla.

[73] Assignee: Phillips Petroleum Company, Bartlesville, Okla.

[21] Appl. No.: 755,606

[22] Filed: Sep. 5, 1991

Related U.S. Application Data

[63] Continuation of Ser. No. 450,403, Dec. 14, 1989, abandoned.

[51] Int. Cl.$^5$ .......................... H01J 5/08; H01K 1/32
[52] U.S. Cl. .................... 313/317; 313/578; 313/580; 428/407
[58] Field of Search ............... 313/580, 578, 113, 107, 313/317, 504, 479, 473, 472, 318, 512, 513; 428/407

[56] References Cited

U.S. PATENT DOCUMENTS

| | | | |
|---|---|---|---|
| 2,909,696 | 10/1959 | Cooper, Jr. ...................... | 313/578 |
| 3,715,232 | 2/1973 | Audesse et al. ................ | 313/317 X |
| 4,030,904 | 6/1977 | Battye et al. ...................... | 65/60 |
| 4,041,344 | 8/1977 | La Giusa ........................ | 313/578 X |
| 4,053,675 | 10/1977 | Blackwell ........................ | 428/426 |
| 4,104,555 | 8/1978 | Fleming ........................ | 313/512 |
| 4,169,181 | 9/1979 | Molari, Jr. ........................ | 428/417 |
| 4,459,506 | 7/1984 | Beck ................................ | 313/578 X |
| 4,482,942 | 11/1984 | Blaisdell et al. ................. | 313/113 X |
| 4,555,748 | 11/1985 | Bradley ........................... | 313/113 X |
| 4,569,006 | 2/1986 | Bergin et al. .................... | 313/113 X |

OTHER PUBLICATIONS

Advertisement from Feb. 1986 issue of *Industrial Engineering News*.

Primary Examiner—Donald J. Yusko
Assistant Examiner—Ashok Patel
Attorney, Agent, or Firm—Laney, Dougherty, Hessin & Beavers

[57] ABSTRACT

A shatter-resistant electric lamp includes a base; contacts for connecting the lamp to a source of electrical energy; a filament or light source electrically connected to the contacts for converting electrical energy to light; a shatterable encasement, connectable to the base, for translucently encasing the filament; and a polymer coating deposited on a first portion of the encasement so that a second portion of the encasement remains uncoated. The preferred polymer coating is poly(phenylene sulfide).

15 Claims, 1 Drawing Sheet

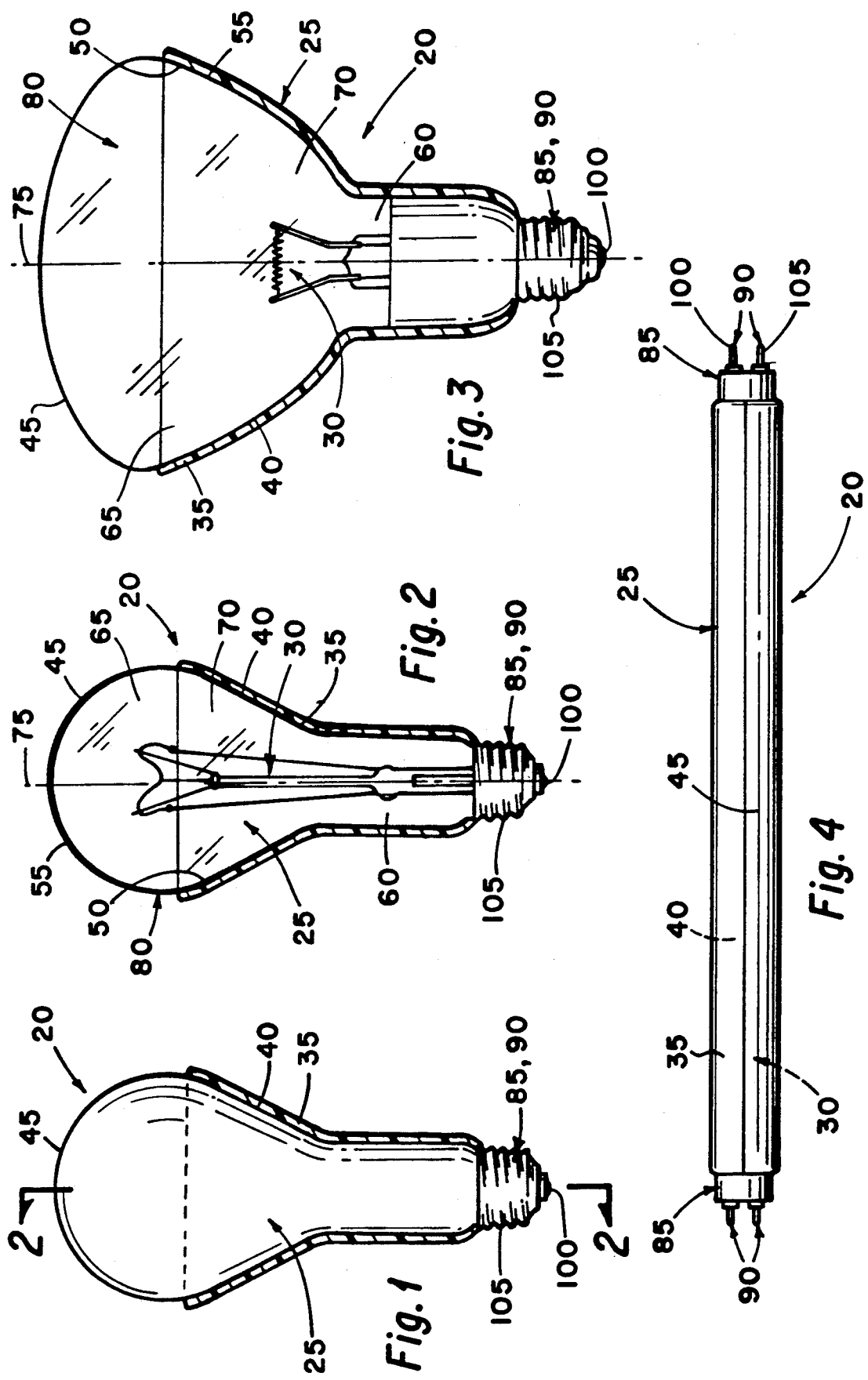

APPARATUS PROVIDING A SHATTER-RESISTANT ELECTRIC LAMP

This is a continuation of copending application Ser. No. 07/450,403 filed on Dec. 14, 1989, now abandoned.

BACKGROUND OF THE INVENTION

1. Field of the Invention

This invention relates to electrical lighting and, more particularly, to apparatus and method providing shatter-resistant electric lamps.

2. Description of the Prior Art

Electric lamps of many varieties are well known, such as incandescent lamps, vapor lamps (sodium vapor lamps, mercury vapor lamps, etc.), arc lamps, fluorescent lamps, ultraviolet lamps, etc. These electric lamps typically have at least one base which provides structural support for the lamp and which also provides positive, negative, and grounding contacts for electrical power. A filament, or light source, which converts electrical energy to light is connected between the contacts. The filament is generally encased in a translucent encasement which protects the filament from the surrounding environment and contains the gaseous vapors, vacuum, etc. surrounding the filament and needed for the electric lamp to operate properly. The encasement is usually a translucent glass container, such as a light bulb.

Electric lamps, particularly the larger sizes, can be very expensive. The cost of such lamps is increased in lamps which operate at high temperatures, e.g., high intensity incandescent lamps such as flood lamps. In order to withstand high temperatures and provide a relatively long life, the lamp components must be made of temperature resistant materials which many times are more expensive. For example, the glass encasement is generally made heavier or thicker to withstand higher temperatures. If the lamp is to be used outdoors, the glass must be able to withstand the outdoor temperature fluctuations, as well as the stresses created when the hot lamp is exposed to cooler rain showers, wind gusts, etc.

Since glass will break or shatter, and in many types of electric lamps the glass bulb is not replaceable, i.e., if the glass bulb breaks, the entire lamp must be replaced, the glass bulb is many times made heavier than necessary to reduce the possibility of breakage. This heavier glass also increases the costs of the electric lamp.

The present invention is directed to apparatus and method which prevent or reduce the breakage of electric lamps.

SUMMARY OF THE INVENTION

Accordingly, the present invention discloses apparatus and method providing a shatter-resistant electric lamp, comprising: a base; contact means for connecting the lamp to a source of electrical energy; filament means, electrically connected to the contact means, for converting electrical energy to light; shatterable encasement means, connectable to the base, for translucently encasing the filament means; and a polymer coating deposited on a portion of the encasement means so that a portion of the encasement means remains uncoated. Preferably, the coating is deposited on the outside of the encasement means and the polymer used is polyphenylene sulfide. The encasement means is normally made of translucent glass.

The invention also provides a shatter-resistant encasement for the light source of an electric lamp which is embodied in the encasement means and polymer coating discussed in the previous paragraph.

It is an advantage of the present invention to improve the shatter resistance of electric lamps.

It is an advantage of the present invention to strengthen the glass bulb of an electric lamp, thereby reducing the thickness and the strength of the glass required in the bulb of the electric lamp.

It is an advantage of the present invention to provide a protective, shatter-resistant coating for an electric lamp which will operate at temperatures above the operating temperatures of the lamp.

Numerous features and advantages of the present invention will be readily apparent to those skilled in the art upon a reading of the following disclosure and taken in conjunction with the accompanying drawings.

BRIEF DESCRIPTION OF THE DRAWINGS

The present invention will be better understood by reference to the examples of the following drawings:

FIG. 1 is a side view of the present invention embodied in a conventional incandescent light bulb.

FIG. 2 is a sectional view taken along line 2—2 of FIG. 1.

FIG. 3 is a sectional view of the present invention embodied in a high intensity incandescent lamp.

FIG. 4 is a side view of the present invention embodied in a conventional tubular electric lamp.

DETAILED DESCRIPTION OF THE PREFERRED EMBODIMENTS

Before explaining the present invention in detail, it is to be understood that the invention is not limited to the details of construction and arrangement of parts illustrated in the accompanying drawings, since the invention is capable of other embodiments and of being practiced or carried out in various ways commensurate with the claims herein. Also, it is intended to be understood that the phraseology or terminology employed herein is for the purpose of description and not of limitation.

FIGS. 1-4 embody apparatus and method providing the shatter-resistant electric lamp, generally designated 20; as well as a shatter-resistant encasement, generally designated 25, for the light source or filament means, generally designated 30, of an electric lamp 20; in accordance with the present invention.

Referring to the example of FIGS. 1-4, the encasement 25 for the light source 30 of an electric lamp 20 comprises: shatterable encasement means, also designated 25, for translucently encasing the light source 30; and a polymer coating 35 deposited on a first portion 40 of the encasement means 25 so that a second portion 45 of the encasement means 25 remains uncoated. The polymer used for the coating 35 may be any polymer which will adhere to the encasement means 25, which will protect the encasement means 25 from breaking or shattering, and which is capable of withstanding the operating conditions (e.g. temperature) of the electric lamp. It is contemplated that such polymers may include poly(arylene sulfide). Poly(arylene sulfide) is used herein to designate arylene sulfide polymers.

Without being limited thereto, it is contemplated that uncured or partially cured poly(arylene sulfide) whether homopolymer, copolymer, terpolymer, and the like, or a blend of such polymers, can be used in the practice of the invention. The uncured or partially cured polymer is a polymer the molecular weight of which can be increased by either lengthening of a molecular chain or by crosslinking or by combination of both by supplying thereto sufficient energy, such as heat. Suitable poly(arylene sulfide) polymers include, but are not limited to, those described in U.S. Pat. No. 3,354,129, incorporated by reference herein. Examples of poly(arylene sulfide) polymers suitable for purposes of the invention include poly(2,4-tolylene sulfide), poly(4,4'-biphenylene sulfide) and poly(phenylene sulfide). Because of its availability and desirable properties (such as high chemical resistance, nonflammability, and high strength and hardness), poly(phenylene sulfide) is the presently preferred poly(arylene sulfide). A preferred poly(phenylene sulfide) is commercially available under the trademark Ryton ® PPS from Phillips Petroleum Company, Bartlesville, Okla.

Various fillers can be used in the compositions useful for the practice of this invention. Typical fillers include fiberglass, talc, mica, clay alumina, titanium dioxide, silica, calcium carbonate, and calcium sulfate. Most preferably the compositions used in the practice of this invention contain one or more of the fillers fiberglass and talc.

Although not required for the practice of the present invention, additional composition components may include silanes, processing aids (e.g., mold release agents), corrosion inhibitors, stabilizers and the like. A preferred silane is the mercaptosilane, 3-mercaptopropyltrimethoxysilane. This silane is preferred because of its extraoridnary utility as a coupling agent. Polyethylene and zinc stearate are examples of useful mold release agents. An example of a corrosion inhibitor is lithium carbonate.

The operating temperature of poly(phenylene sulfide) exceeds the highest temperature that typical electric lamps reach in normal operation. This feature is enhanced by the fact that poly(phenylene sulfide) becomes more flexible as its temperature increases, which also increases the shatter-resistance of the poly(phenylene sulfide) coated electric lamp 20.

Referring to the example of FIGS. 2 and 3, the encasement means 25 has an inside surface 50 adjacent the light source or filament means 30 and an outside surface 55. Preferably, the polymer coating 35 is deposited on the outside surface 55 of the encasement means 25. Placing the coating 35 on the outside surface 55 is simpler, since the encasement means 25 is normally an enclosed shape, such as the light bulb 25 exemplified in FIGS. 1-4. Also, depositing the polymer coating 35 on the outside surface 55, rather than the inside surface 50, places the coating 35 between the shatterable encasement means 25 and most potential sources of impact breakage, which will normally come from the outside of the encasement means 25. The coating 35 may also be deposited on the inside surface 50, or on both the inside surface 50 and outside surface 55 and achieve advantages of the invention, such as reducing breakage due to sudden temperature changes.

Referring to the example of FIGS. 1-3, typically the encasement means 25 comprises a smaller first end 60 connectable to the lamp 20, a larger second end 65 spaced away from the first end 60, and a side section, generally designated 70, sealingly connected between the first end 60 and the second end 65. The first and second ends 60, 65 generally define an axis 75 extending between the first and second ends 60, 65. The polymer coating 35 is deposited on the side section 70. In the preferred embodiment, the polymer coating 35 is deposited on the side section 70 so that the coating 35 extends from the first end 60 of the encasement means 25 to about the peripheral area 80 of greatest radial extension (radially with respect to axis 75) by the side section 70. Normally, the polymer coating 35 should extend from the first end 60 to just below the peripheral area 80 of greatest radial extension by the side section 70, in order to allow maximum illumination by the electric lamp 20. The preferred polymer coating 35 is opaque and the uncoated second portion 45 of the encasement means 25 provides a translucent area for light to pass through the encasement means 25. Preferably, the encasement means 25 is made of translucent plastic or glass, and more preferably, the encasement means 25 is a translucent glass bulb, also designated 25.

Referring to the example of FIGS. 1-4, in the preferred embodiment, the invention is a shatter-resistant electric lamp 20, comprising: a base, generally designated 85; contact means, generally designated 90, for connecting the lamp 20 to a source of electrical energy; filament means 30, electrically connected to the contact means 90, for converting electrical energy to light; shatterable encasement means 25, connectable to the base, for translucently encasing the filament means; and polymer coating 35 deposited on a portion of the encasement means 25 so that a remaining portion of the encasement means remains uncoated. The encasement means 25 and coating 35 are the same as discussed above.

Referring to the example of FIGS. 2 and 3, typically the base 85 structurally supports the remainder of the lamp 20 and the first end of the encasement means 25 is connected to the base 85. Contact means 90 typically includes a positive contact 100 and a negative contact 105, and may include a ground connection (not illustrated), for connecting the lamp 20 to a source of electrical power. In a typical incandescent lamp, as exemplified in FIGS. 2 and 3, the negative contact 105 is also the main portion of the base 85 and the positive contact 100 extends through the base 85 in an electrically isolated manner, as is well known in the art.

The apparatus and method of the present invention may be used with virtually any type of electrical lamp 20 having a shatterable encasement means 25, including vapor lamps, arc lamps, fluorescent lamps, ultraviolet lamps, incondescent lamps, etc. The filament means or light source 30 will take a variety of forms depending on the type of electrical lamp 20, i.e., an incandescent lamp 20 typically uses a tungsten wire filament, a mercury vapor lamp typically uses an inner transparent quartz arc tube for a filament, a fluorescent lamp typically uses a coating of activated powdered phosphor in mercury vapor between two electrodes as a filament, etc.

The encasement means 25 may be pear-shaped, like a standard incandescent light bulb 25, wedge-shaped, trapezoidally-shaped, tube-shaped, or take virtually any shape which may be used to encase filament means 30. The polymer coating 35 is normally applied to the portions of the encasement means 25 through which it is not necessary to transmit light, i.e., portions which may be structurally necessary, but which are not necessary or needed for illumination purposes. The polymer coating 35 should normally be placed on the surfaces of the encasement means 25 which are facing or directed away from areas to be illuminated by the electric lamp 20. The coating 35 should cover as much of the outside surface 55 of the encasement means 25 as possible without obscuring or restricting the desired illumination and direction of the illumination by the electric lamp 20. For example, it may be advantageous to coat one-half of the encasement means 25 or tube of a tubular-shaped electric lamp 20, as exemplified in FIG. 4. The invention is more typically used with a high intensity incandescent lamp 20, such as a flood light, and the polymer coating 35 is deposited on the outside surface 55 of the lamp 20 coextensive with the metallized coating (not illustrated) which is normally deposited on the inside surface 50 of the lamp. The metallized coating is used to direct or reflect and enhance the illumination of the lamp 20, rather than to structurally strengthen the lamp 20. Normally, the area that is metallized on the inside of a flood lamp extends from the first end 60 to the second end 65 on the inside surface 50 of the side section 70.

The invention also includes the method of making the glass bulb of an electric lamp 20 shatter-resistant, comprising coating a first portion 40 of the glass 25 with polymer and leaving a second portion 45 of the glass 25 uncoated. As with the apparatus described above, preferably the polymer coating is poly(phenylene sulfide). It is also preferable that the coated portion 40 of the glass 25 be on the outside surface 55 of the glass 25.

Preferably, the electric lamp 20 is powder coated using an electrostatic spray gun. The powder coated lamp is then placed in an oven and heated at 700° Fahrenheit for approximately thirty minutes to melt and cure the polymer coating 35. The polymer coating is cured when the melt flow goes to zero and the coating 35 is solidified on the electric lamp 20.

Each electrostatic spray coating will give a coating 35 of polymer between 0.001 and 0.003 inches thick. Preferably, the poly(phenylene sulfide) coating is about 0.001 inches thick. The thickness of the coating can be increased by adding additional electrostatic sprayings, i.e., the coating may be built up in 0.001 to 0.003 inch layers, each layer requiring an electrostatic spray coating and a 700° Fahrenheit melting and curing in an oven. Poly(phenylene sulfide) is usually brittle in its normal applications and is known to chip in such applications, i.e., 0.50 to 0.100 inch thicknesses. It is only in the thin coatings used with the present invention that the structural strength and resilience exhibited in thin coatings was discovered.

The practice of the invention will be better understood by a consideration of the following example, which is provided by way of illustration and explanation and is not intended to be limiting. Following the example, which presents several alternative methods for coating the electric lamp 20, should result in a shatter-resistant electric lamp 20 or shatter-resistant encasement means 25 having the beneficial properties of this invention.

EXAMPLE

This is a calculated example of the invention for coating an incandescent light bulb. It is applicable to any wattages including spotlight 300 watt light bulbs that have a glass or plastic construction. The coating can cover up to a majority of the surface of the bulb, for example, in a spotlight that directs the light only from the top section of the light bulb globe, the coating covers from just above the metallic base up to the furthest, outward extending part of the bulb globe or up to the lens area. In a normal 100 watt light bulb, the coating would extend from just above the metallic base to just below the furthest outward extending part of the bulb globe. The following example is directed to an ordinary, commercially available 100 watt glass globe light bulb such as Sylvania's Soft Glow.

EXAMPLE—SURFACE PREPARATION

The surface must be free from contamination such as oxidation, oil, grease, etc. If cleaning is needed, it may be accomplished by chemical treatment, grit blasting or a combination of the above. Preferably, a solvent of 1:1 xylene/acetone mixture followed by rinse in acetone is used to wash the surface. The area to be coated is then grit blasted with a fresh, clean, 60–120 mesh aluminum oxide at a pressure of 15 psi or less so as not to crack the bulb. After surface treating, the treated area should be cleaned, accomplished by various methods such as vapor degreasing, solvent washing, sonic degreasing, or thermal degradation. Preferably, cleaning is by thermal degradation. The bulb is heated for $\frac{1}{2}$ to 2 hours at 700° F. (371° C.) to complete the surface preparation.

EXAMPLE—PRIMER FORMULATION AND APPLICATION

Most materials to be coated with poly(phenylene sulfide) do not require primers. However, good adhesion can be accomplished with a primer and the following primer formulations are presented whenever a primer is desired, for example a light bulb in a corrosive environment, such as sandy environments, may prefer a primer to extend the life of the coating.

A typical primer consists of one part poly(phenylene sulfide) ("PPS") sold under the trademark "Ryton" ® PPS, grade VI, from Phillips Petroleum Company, with one part black cobalt oxide and 3.65 parts propylene glycol. The mixture is ball milled for 16 to 24 hours. The slurry primer is applied to the clean surface of the bulb evenly with a paint spray gun to a thickness of 0.75 to 1 mil (0.019 to 0.0254 mm) and then cured at 700° F. (371° C.) for 15 minutes. Other primer coatings methods such as electroless nickel or silver plating is also acceptable.

EXAMPLE—COATING FORMULATION AND APPLICATION

The resin coating formulation should be those designed for coating applications but is not limited thereto. Presently, two grades of Ryton ® PPS powders are preferable for coating: VI and PRO1. (VI and PRO1 are grades of Ryton ® PPS from Phillips Petroleum Company.) The VI grade is better utilized in a water base slurry with or without fillers and pigments whereas the PRO1 grade is preferably used for electrostatic spray. Both, however, can be used singularly, with other powders, with or without fillers and pigments, and in powder or slurry coating processes. The coating can be accomplished by a variety of methods such as electrostatic spray, flocking, fluidized bed, slurry coating, etc.

A typical water based pigmented formulation comprises 100 parts Ryton ® PPS, grade VI, 16 parts titanium oxide, 16 parts pigment (able to withstand 700° F.) (371° C.), 185 parts water, 60 parts propylene glycol, and 3.5 parts of a wetting agent such as alkylphenooxypolyethoxy alcohol. The mixture is ball milled for 16 hours.

A typical water based unpigmented formulation comprises 100 parts Ryton ® PPS, grade VI, 130 parts water, 20 parts propylene glycol and 2.5 parts of a wetting agent as mentioned above. Again, this mixture is ball milled for approximately 16 hours.

A typical electrostatic spray unpigmented formulation comprises pulverized Ryton ® PPS, grade PR01 by itself.

A typical electrostatic spray pigmented formulation comprises pulverized Ryton ® PPS, grade PR01, in combination with a pigment such as titanium oxide at a 2 percent loading. Pigments and loadings would be adjusted according to desired color.

EXAMPLE—ELECTROSTATIC SPRAY COATING

Electrostatic spray coating can be used on either cold or hot surfaces. On a cold surface, after cleaning, the surface is coated evenly with a 0.002-0.003 inch (0.0508-0.0762 mm) thickness per pass. It is then left in a circulating air oven at 700° F. (371° C.) for 5-10 minutes after the powder melts, after which it is removed and cooled. This process is repeated until the desired thickness is achieved. After final coating, cure at the above temperature (700° F.) as follows: up to, 0.005 inch (0.127 mm) thickness, cure for 45 minutes; 0.005-0.01 inch (0.127-0.254 mm) thickness, cure for 90 minutes, etc.

EXAMPLE—FLOCKING

Flocking (powder spraying) is used on a heated part. The part is first heated to 700° F. (371° C.). Dry powder is then sprayed on the part using a flocking gun to a thickness of 0.01-0.015 inches (0.254-0.381 mm). The powder should melt during spraying on the surface. After coating, return the part to an air oven and cure according to the schedule spelled out in the previous section.

EXAMPLE—FLUIDIZED BED

Fluidized bed coating is directed at thick parts that retain heat such as thick wall spotlights (outside surface and/or inside surface). Preheat part to 700° F. (371° C.) and then immerse in a fluidized bed of the resin powder for 1-3 seconds to apply a coat of 0.005-0.01 inches (0.127-0.254 mm). Remove from the bed and remove unmelted excess powder by air or vibration. The part is then baked in an oven at 700° F. (371° C.). Repeat as necessary for desired thickness while part remains hot. Then cure according to the above schedule.

EXAMPLE—SLURRY COATING

Slurry coating is directed mostly at water based slurrys and can be applied with most standard industrial type sprayguns. For example, a Brink Model 62 paint spraygun operating at 80 psi can be used. Based on the equipment, air pressures of 15-80 psi can be utilized. The spray gun should be adjusted to produce a fine mist that gives a 0.001-0015 inch (0.0254-0.038 mm) wet film coating. The spray is applied to the clean part without preheat. After coating the part is baked at 700° F. (371° C.). Repeat for additional coats with a final cure based on the coating thickness.

Any of the example coating methods discussed above can be used with the appropriate coating formulations on the 100 watt light bulb to give a PPS coating that results in an increased shatter resistant light bulb. The coating should also have very good adhesion to the glass surface of the bulb. The coating should cover as much surface area as possible without obscuring the light output of the bulb.

While the invention has been described with a certain degree of particularity, it is manifest that many changes may be made in the details of construction and arrangement of components without departing from the spirit and scope of this disclosure. It is intended to be understood that the invention is not limited to the embodiments and methods set forth herein for purposes of exemplification, that the invention is to be limited only by the scope of the attached claims, including the full range of equivalency to which each element thereof is entitled.

What is claimed is:

1. A shatter-resistant electric lamp, comprising:
a base;
contact means for connecting the lamp to a source of electrical energy;
filament means, electrically connected to the contact means, for converting electrical energy to light;
shatterable encasement means, connectable to the base, for translucently encasing the filament means, the shatterable encasement means having a first surface; and
a poly(phenylene sulfide) coating deposited on a first portion of the first surface of the encasement means so that a second portion of the first surface of the encasement means remains uncoated.

2. The lamp of claim 1:
wherein the poly(phenylene sulfide) coating is between about 0.001 inches and about 0.003 inches thick.

3. The lamp of claim 1:
wherein the encasement means is made of translucent glass.

4. The lamp of claim 1:
wherein the poly(phenylene sulfide) coating is opaque.

5. The lamp of claim 1:
wherein the encasement means has an inside surface adjacent the filament means and an outside surface; and
wherein the first surface of the encasement means is the outside surface of the encasement means.

6. The lamp of claim 1 in which the encasement means comprises:
a smaller first end connectable to the base, a larger second end spaced away from the first end, and a side section sealingly connected between the first end and the second end, the first and second ends generally defining an axis extending between the first and second ends; and
wherein the poly(phenylene sulfide) coating is deposited on the side section.

7. The lamp of claim 6:
wherein the poly(phenylene sulfide) coating is deposited on the side section so that the coating extends from the first end of the encasement means to a peripheral area of about greatest radial extension by the side section.

8. The lamp of claim 1 in which the encasement means comprises:
a glass bulb.

9. A shatter-resistant electric lamp, comprising:
a base;
contact means for connecting the lamp to a source of electrical energy;
filament means, electrically connected to the contact means, for converting electrical energy to light;

shatterable encasement means, connected to the base, for encasing the filament means, the encasement means being made of translucent glass and the encasement means having a first surface; and an opaque poly(phenylene sulfide) coating deposited on a first portion of the first surface of the encasement means so that a second portion of the first surface of the encasement means remains uncoated and translucent, the coating being between about 0.001 inches and about 0.003 inches thick.

10. A shatter-resistant electric lamp, comprising:

a base;

contact means for connecting the lamp to a source of electrical energy;

filament means, electrically connected to the contact means, for converting electrical energy to light;

a translucent glass bulb having a smaller fist end connectable to the base, a larger second end spaced away from the first end, a side section sealingly connected between the first end and the second end, the first and second ends generally defining an axis extending between the first and second ends, an inside surface adjacent the filament means, and an outside surface; and an opaque, poly(phenylene sulfide) coating deposited on a first portion of the outside surface of the translucent glass bulb so that a second portion of the outside surface of the translucent glass bulb remains uncoated and translucent, the coating extending from the first end of the translucent glass bulb to a peripheral area of about greatest radial extension by the side section, the coating being between about 0.001 inches and about 0.003 inches thick.

11. An encasement for the light source of an electric lamp, comprising:

shatterable encasement means, connectable to the lamp, for translucently encasing the light source, the shatterable encasement means having a first surface; and a poly(phenylene sulfide) coating deposited on a first portion of the first surface of the encasement means so that a second portion of the first surface of the encasement means remains uncoated.

12. The lamp of claim 11:

wherein the poly(phenylene sulfide) coating is opaque.

13. The lamp of claim 11:

wherein the encasement means has an inside surface adjacent the light source and an outside surface; and wherein the first surface of the encasement means is the outside surface of the encasement means.

14. The lamp of claim 11 in which the encasement means comprises:

a smaller first end connectable to the lamp, a larger second end spaced away from the first end, and a side section sealingly connected between the first end and the second end, the first and second ends generally defining an axis extending between the first and second ends; and wherein the poly(phenylene sulfide) coating is deposited on the side section so that the coating extends from the first end of the encasement means to a peripheral area of about greatest radial extension by the side section.

15. The lamp of claim 11 in which the encasement means comprises:

a glass bulb.

* * * * *